United States Patent [19]

Musil

[11] Patent Number: 5,291,644
[45] Date of Patent: Mar. 8, 1994

[54] PLASTIC BELT FASTENER AND APPARATUS THEREFOR

[75] Inventor: Edward C. Musil, Lyons, Ill.

[73] Assignee: Flexible Steel Lacing Company, Downers Grove, Ill.

[21] Appl. No.: 893,937

[22] Filed: Jun. 5, 1992

Related U.S. Application Data

[62] Division of Ser. No. 722,705, Jun. 28, 1991, Pat. No. 5,157,812.

[51] Int. Cl.$^5$ ............................................. B23P 19/00
[52] U.S. Cl. .............................. 29/243.53; 29/243.5; 72/67
[58] Field of Search ............... 24/33 P, 33 B, 33 M; 29/243.53, 243.54, 526 A, 432, 504, 798, 243.5, 243.51; 72/67

[56] References Cited

U.S. PATENT DOCUMENTS

| | | | |
|---|---|---|---|
| 3,173,281 | 3/1965 | Bodmer | 72/67 |
| 3,913,180 | 10/1975 | Pray | 24/33 B |
| 4,258,461 | 3/1981 | Pray | 24/33 B |
| 4,391,121 | 7/1983 | Taruntaer | 72/67 |
| 4,642,081 | 2/1987 | Balomenos | |
| 4,996,750 | 3/1991 | Musil | |

FOREIGN PATENT DOCUMENTS

| | | |
|---|---|---|
| 3642803 A1 | 6/1988 | Fed. Rep. of Germany . |
| 1071174 | 6/1967 | United Kingdom . |
| 1261681 | 1/1972 | United Kingdom . |
| 2145188 A | 3/1985 | United Kingdom . |

Primary Examiner—Robert C. Watson
Attorney, Agent, or Firm—Fitch, Even, Tabin & Flannery

[57] ABSTRACT

Disclosed is an integral one piece plastic fastener for securing belt ends together. The fastener has upper and lower plastic plates clasped to a belt end with integral, hollow rivets projecting from the upper plate through openings in the bottom plate and with hollowed ends of the rivets deformed to form rivet heads for maintaining clasping of the plastic plates on the belt end. Also disclosed is a rivet head forming tool which smoothly forms rivet heads by a spinning process in which a rotating tool is forced against the hollow end of the rivet and spun with sufficient velocity and applied with a high force to create a sufficient heat and pressure to cause the end wall of the rivet to curl and turn over radially outwardly to from a rivet head tightly pushing against the lower plate of the fastener.

8 Claims, 4 Drawing Sheets

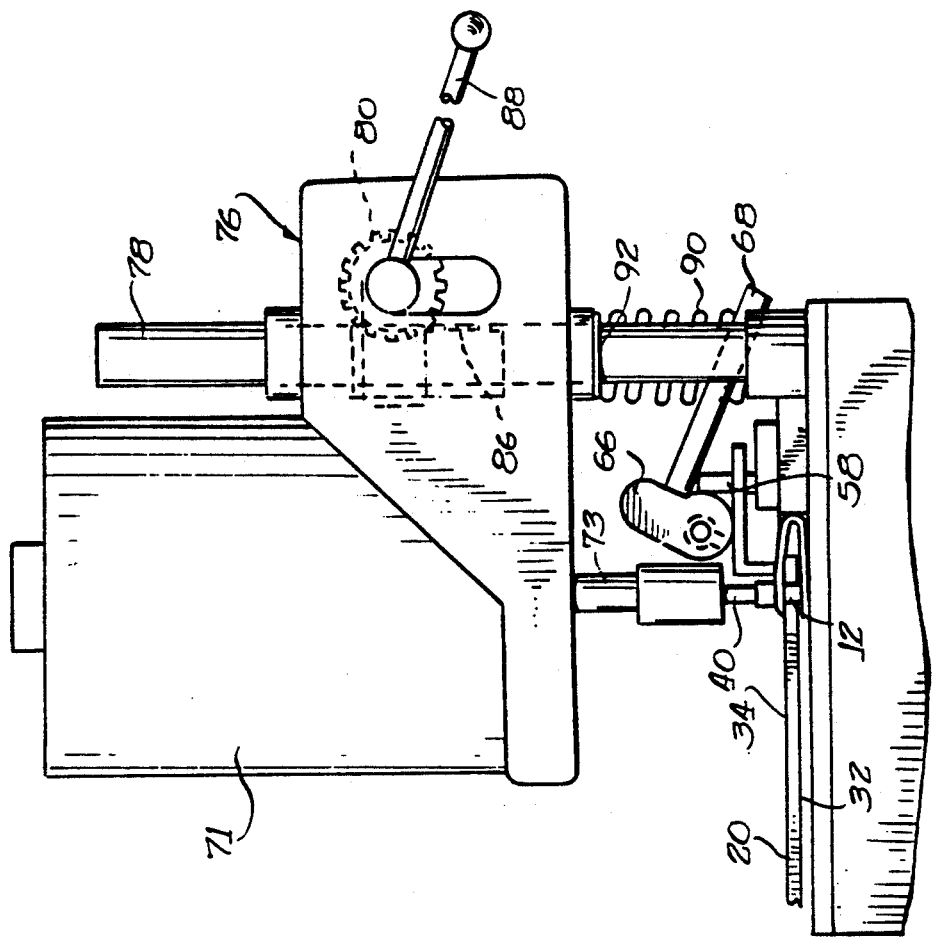
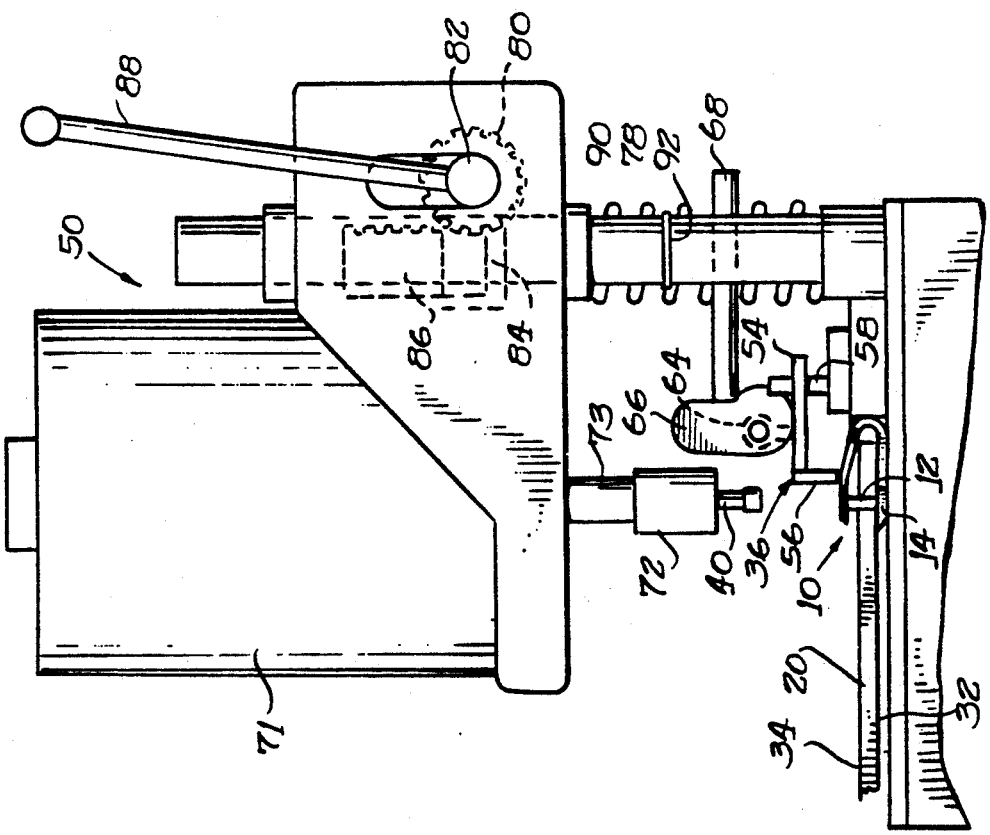

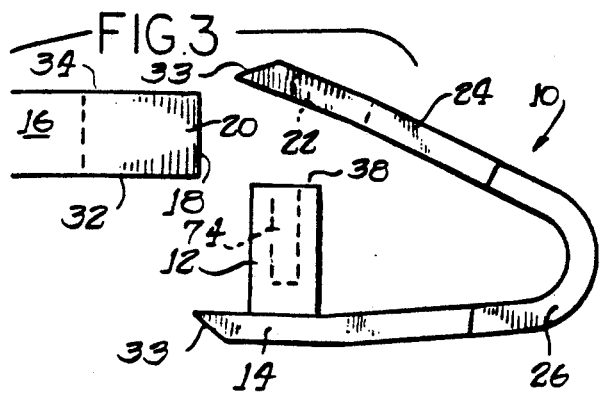
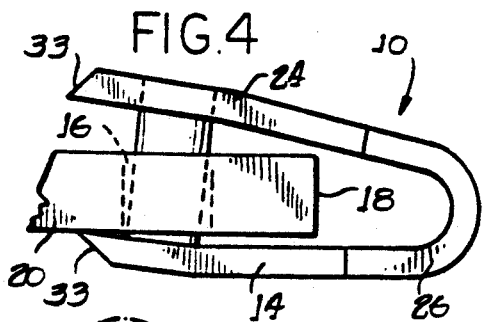
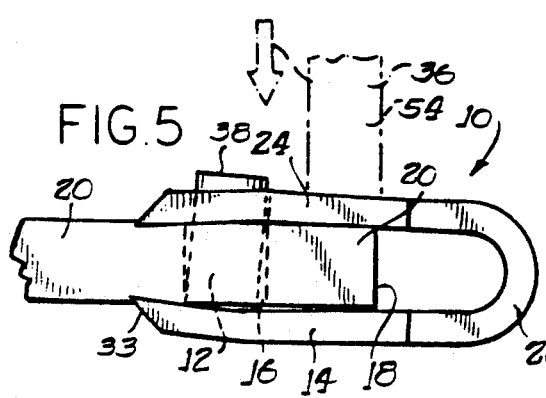
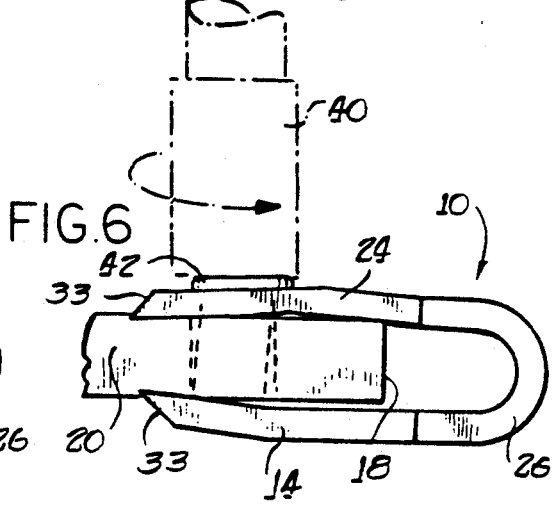
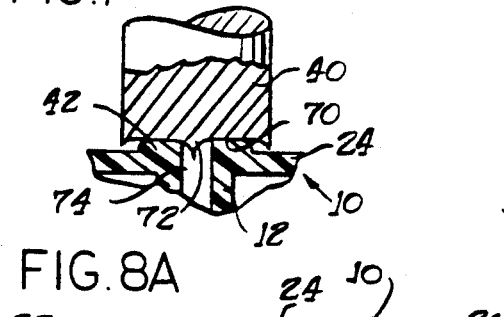
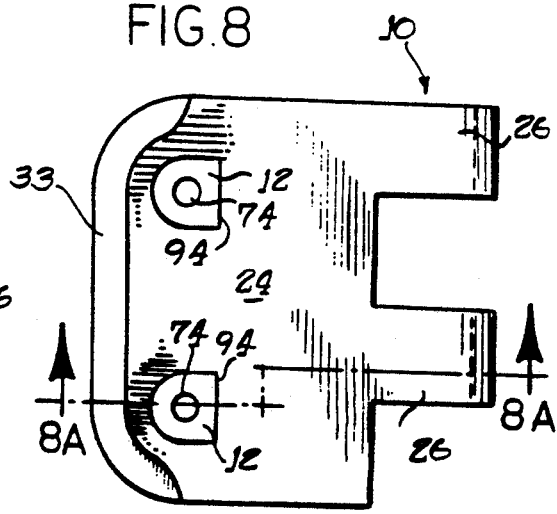
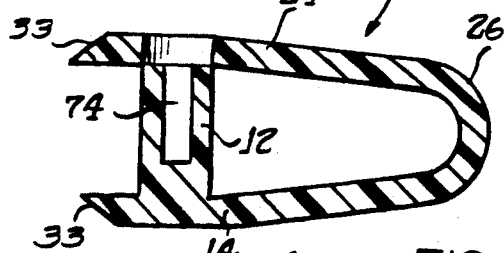
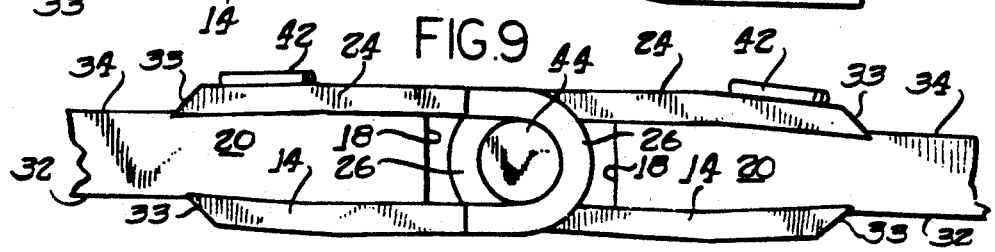

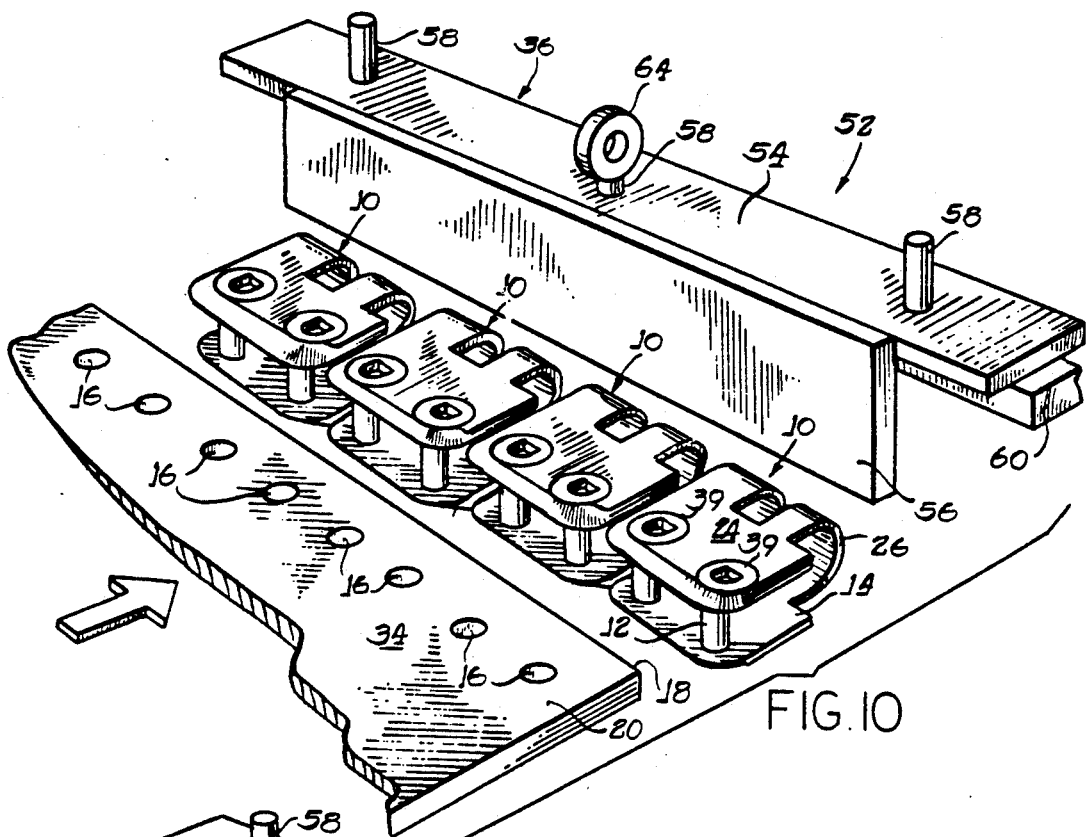
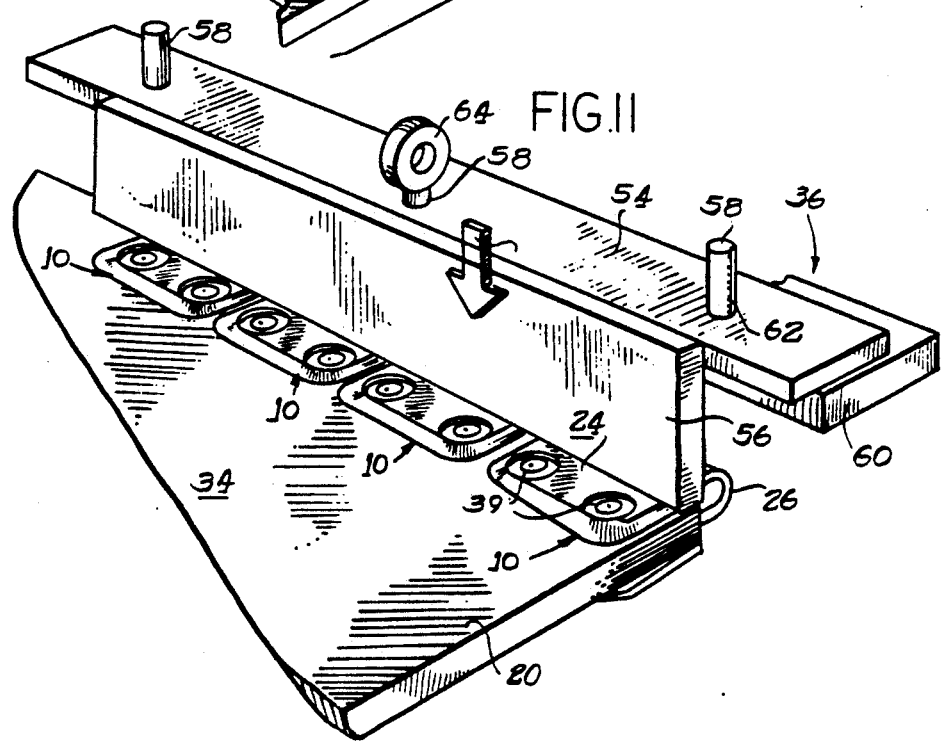

PLASTIC BELT FASTENER AND APPARATUS THEREFOR

This is a division of application Ser. No. 722,705, filed Jun. 28, 1991 now U.S. Pat. No. 5,157,812.

FIELD OF THE INVENTION

The present invention relates to belt fasteners, and more particularly to plastic belt fasteners used for joining ends of conveyor belts together.

BACKGROUND OF THE INVENTION

A wide variety of fastening devices have been developed for joining the ends of conveyor belts together to form a continuous belt. Most of these devices are formed of metal. For may applications, however, it is desirable that the belt fastener be non-metallic. For instance, in the food industry there may be health codes or other regulations requiring metal detectors to detect the possible presence of metal particulate in the foods being carried by the conveyor belt. Metallic belt fasteners have been found to trigger the metal detectors which sense the metal fastener as it rotates with the belt, giving a false indication of the presence of metal in the food. Other food applications may involve foods which, for health concerns, must be prevented from contacting metal during all states of preparation. Metallic belt fasteners are undesirable for such applications. Furthermore, plastic belt fasteners are desirable for many non-food applications as well. An example of this is conveyor belts used in x-ray scanners at airports or the like.

An example of one prior art plastic belt fastener is found in British Pat. No. 1,261,681. The plastic belt fastener disclosed therein is undesirable in that at least one of the fastener plates are hinged by living hinge areas of reduced cross-sectional thickness to allow for bending thereat. Such plastic fasteners may break prematurely at the areas of reduced thickness of the hinge loops during normal operating loads. Also, the two plates of the fastener disclosed in the British patent are maintained clamped about the belt by a threaded engagement which has been found inadequate to withstand the separating forces imposed on the fastener during normal operation. The fasteners are formed with only a single hinge loop rather than the usual two loops in a metal hinge plate fastener. The bottom plate has upstanding bosses to receive projections from the upper plate and these bosses require larger holes in the belt, thereby weakening the belt. It is desirable to provide a non-metallic belt fastener which has sufficient strength to withstand normal conveyor belt loads.

SUMMARY OF THE INVENTION

In accordance with the present invention, there is provided an integral one piece plastic fastener having upper and lower plastic plates clasped to a belt and with integral, hollow rivets projecting from the upper plate through openings in the bottom plate and with hollowed ends of the rivets deformed to form rivet heads. The preferred rivet heads are smoothly formed by a spinning process in which a rotating tool is forced against the hollow ends of the rivet and spun with sufficient velocity and applied with a high force to create sufficient heat and pressure to cause the end wall of the rivet to curl and turn over radially outwardly to form a rivet head tightly pushing against the lower plate of the fastener.

The preferred lower plate has openings sized only to a size sufficient to receive the rivet ends rather than having upwardly projecting large diameter female bosses on the lower plate as in the prior art. These prior art bosses required larger sized holes in the belt than the rivet projections in order to receive the female bosses and this weakened the belt relative to holes in the belt clasped with the belt fasteners of the present invention.

In accordance with another aspect of the invention, the belt fasteners are molded to their closed position so that the upper and lower plates have a memory, and a spring bias force when opened, to return to tightly grip the upper and lower surfaces of the belt. Preferably, the closed position of the plates also projects the rivet ends through the openings in the lower plate. This is in contrast to the prior art in which the belt fasteners were molded in their open position, resulting in a spring bias force urging the upper and lower plates apart and, accordingly, imposing additional stresses in the fastener.

The fastener of the present invention is also stronger than the above-described prior art fastener which has a very thin cross section forming a living hinge to allow the downward hinge bending of one plate toward the opposite plate. This thin cross section is a point of weakness and is continually flexed as the fasteners rotate about pulleys or sprockets when moving from one run, such as an upper run, to a lower run for the conveyor belt.

The method and apparatus for applying these plastic fasteners to the belt preferably includes the steps of providing the plastic fasteners with the integral rivets and forming holes in the belt ends sized to the rivet projections and not to larger female boss diameters as in the prior art. The plastic rivet ends are inserted through the holes in the belt ends, and then the ends of the integral rivets are deformed and enlarged. While heat may be used, the preferred deformation is by way of applying a spinning tool with greater than manual force to a hollow end of the rivet to soften the plastic by heat generated by friction and to use a large axially directed force and a curved surface on the tool to flare the rivet end walls radially outwardly and inwardly toward the belt fastener plate. The high pressure forces the belt plates tightly into compression with the opposite sides of the belt.

The preferred apparatus used with this method includes a frame, on which is mounted a spinning drive motor for the spinning tool, and a clamp for clamping the fasteners onto the belt. A line of fasteners are held in alignment on the frame and the tool may be indexed relative to the fasteners to apply successive fasteners.

The invention will be more fully understood as the description proceeds and the features of novelty which characterize this invention will be pointed out with clarity.

BRIEF DESCRIPTION OF THE DRAWINGS

In the drawings, wherein like elements are reference alike:

FIG. 1 is a side elevational view of a forming press embodying various features of the present invention, shown in a raised position with the forming tool thereof spaced from a fastener;

FIG. 2 is a side elevational view of the forming press of FIG. 1, shown in a lowered position with the forming tool in contact with a fastener;

FIG. 3 is a side elevational view of a fastener embodying various features of the present invention, shown in an open position in proximity with a belt end;

FIG. 4 is a side elevational view of the fastener of FIG. 3, shown in an intermediate position, with the rivet thereof extending through an aperture in the belt end;

FIG. 5 is a side elevational view of the fastener of FIG. 3, shown in a closed position with the rivet end extending through an aperture in the bottom plate;

FIG. 6 is a side elevational view of the fastener of FIG. 3, which a forming tool shown in skeleton forming a rivet head;

FIG. 7 is an enlarged cross-sectional view of the forming tool and rivet head shown in FIG. 6;

FIG. 8 is a top elevational view of the belt fastener of FIG. 3;

FIG. 8A is a side cross-sectional view of the fastener of FIG. 3 taken along line A—A of FIG. 8;

FIG. 9 is a side elevational view of two belt ends fastened together by fasteners of the present invention;

FIG. 10 is a perspective view of a clamp used in accordance with the present invention to clamp belt fasteners in a closed position about a belt end; and FIG. 11 is a perspective view of the clamp of FIG. 10, shown clamping a plurality of fasteners in a closed position.

DETAILED DESCRIPTION OF THE PREFERRED EMBODIMENT

Figure 2A:
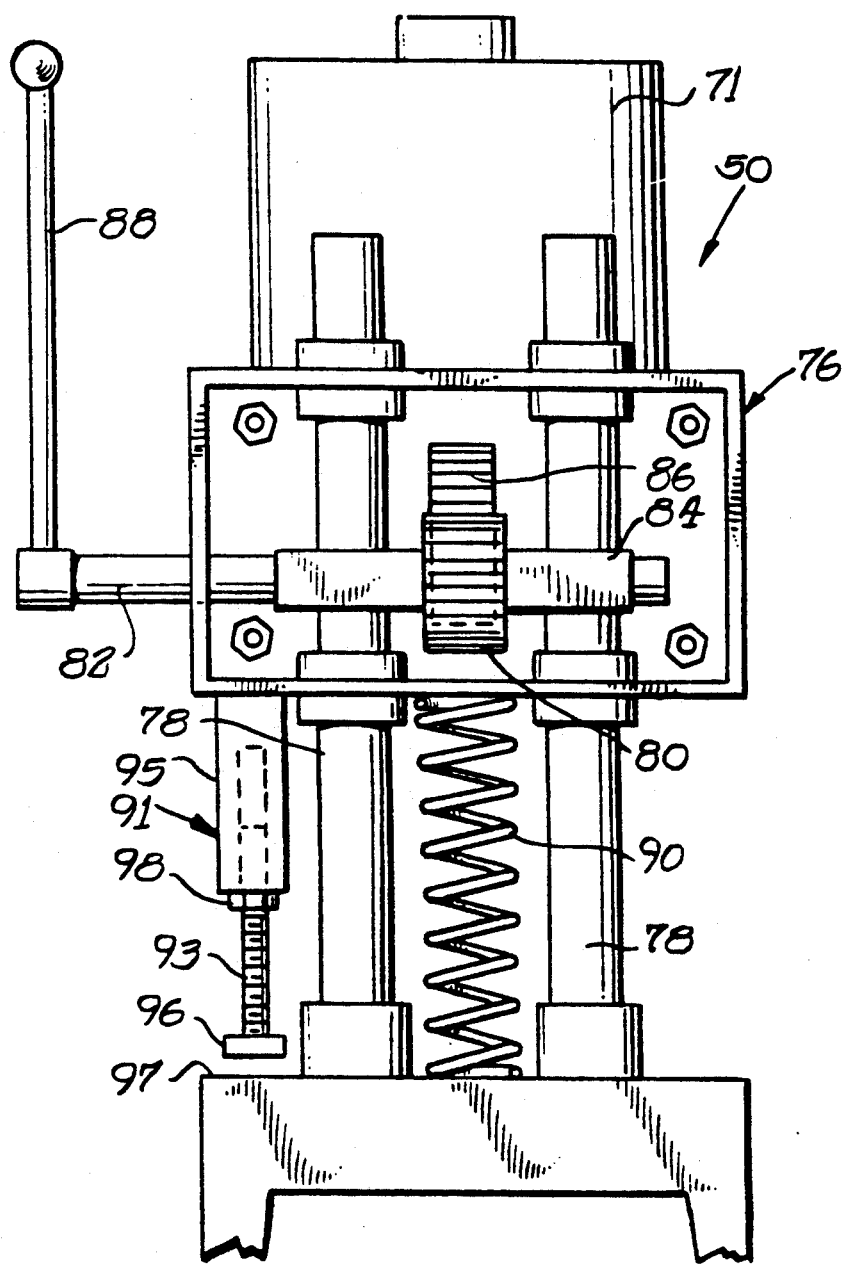
FIG. 2A is a rear elevational view of the forming press of FIG. 1, shown in a raised position.

As shown in the drawings for purposes of illustration, the invention is embodied in a belt fastener made of plastic and a fastening method and apparatus. With initial reference to FIGS. 3 through 8, a plastic belt fastener embodying various features of the present invention is illustrated and indicated generally at 10. In the illustrated embodiment, the belt fastener 10 is an integral one piece plastic fastener which includes a pair of integral, hollow rivets 12 projecting from a top plate 14, which rivets 12 extend through belt apertures 16 provided at the end 18 of the belt 20 to be fastened. The top plate 14 and bottom plate 24 are flexibly interconnected by an integral hinge loop 26, and are positioned on an upper side 32 of the belt 20 and a lower side 34 of the belt 20, respectively. Plastic fasteners as disclosed in the aforementioned British patent are formed with their top plate projecting upward at 90° to the bottom plate until fastened to the belt. There is provided a thin line or living hinge at the end of the top plate about which the top plate pivots downwardly to be parallel to the bottom plate when fastened to the belt. Thus, the top plate is biased by the memory of the plastic to return to its raised position and lift from the belt. This is an undesirable condition because it is desired to have the top plate remain tightly against the top surface of the belt. Also, the thin cross section of plastic forming the living hinge reduces the strength of the fastener and is a place where forces may localize with the fastener flexing as it goes around the belt drums or pulleys and be a source of failure for the fastener. The lower plate of this fastener as disclosed in the aforesaid patent has upwardly projecting bosses which are hollow to receive the rivet or projections depending from the upper plate. The projections or rivets are said to mechanically interlock but this interlocking is not always sufficient and it has been observed that sometimes ends of the rivets have been enlarged by melting the same. The melted ends of the rivets were rough and uneven. Thus, there is a need for a new and improved one piece, plastic belt fastener having integral plastic rivets thereon.

In accordance with the present invention, there is provided a new and improved plastic, one-piece, belt fastener having integral plastic rivets 12 that extend through apertures 16 in the belt and aligned apertures 22 in the lower plate and are formed with enlarged rivet heads 42 that clamp the plates to the belt. The preferred rivets have hollow bores or portions 74 that receive the end of a forming or staking tool that enlarges the rivet end 38 into an outwardly placed rivet head 42 that is sufficiently large and strong that it will not be pulled through the lower plate apertures in normal usage of the belt fastener.

The preferred plastic fastener has the rivet head 42 protected by being located in a recess or groove the occurrence of wear to the rivet head 42, which may result in sufficient degradation of the rivet head 42 that the rivet head is allowed to pass through the bottom plate 24, the bottom plate 24 includes a recess 39 in which the rivet head is accommodated. The recess 39 has a diameter which is larger than that of the formed rivet head 42, which larger diameter is necessary in order to accommodate the forming tool 40 which will be explained further, below. The bottom plate 24 in which the recess 39 is formed may be made thick relative to the top plate 14 so that the bottom plate and top plate have approximately the same cross-sectional area at the rivets 12. Recessing of the rivet heads has been found particularly advantageous in applications employing a light weight conveyor belt in which slide plates or slide bars are used to support the belt. Slide plates have sharp edges at the beginning and end of the plates which catch on the rivet heads 42 as the fasteners 10 pass across the plates causing wear and tear on the rivet heads and eventually reducing the size of the rivet head 42 until it passes through the opening 22 in the lower plate. Provision of a recess 39 to accommodate the rivet head 42 therein minimizes rivet head wear. By way of example only, the thickness for the bottom plate may be 0.085 inch as contrasted a thickness of 0.060 inch for the top plate. The depth of the recess is about 0.040 inch and the diameter is about 0.320 inch for the illustrated fastener. Manifestly, these dimensions will be changed with different sizes of fasteners.

The formation of a rivet head 42 of sufficient strength and durability has been a limiting factor in the use and development of plastic fasteners. The rivet heads 42 are preferably formed to have outwardly flared, convex walls by means of a spinning operation in which a spinning tool 40 is brought into the hollow bore 74 of the rivet and is spun with sufficient speed to generate head and a large force (greater than manual force from a hand held drill) is applied to the spinning tool to cause the hollow rivet walls to reform. The shape of the spinning tool 40 (FIG. 7) is preferably such to curl the annular rivet wall into a flared, rounded and curled rivet head. In order to provide a force greater than can be practically applied manually using a hand-held drill and to provide more uniform force and speed to curl all of the heads of the rivets in a line of belt fasteners across the belt, it is preferred to use an applicator tool in the form of a forming press 50 that includes a force actuator such as the mechanical advantage from a lever and gear system or a hydraulic or pneumatic actuator to provide sufficient spinning force and to locate the force substantially on the vertical axis of the rivet bores to flare the rivet walls evenly. Also, the preferred applicator tool has a stop 92 that limits the depth of penetration of the spinning tool into the rivet end bores to assure a desired size for the head. As will be explained in greater detail hereinafter a long line of aligned belt fasteners are preferably mounted or clamped to the belt within the applicator tool and the spinning head in seriatim fashion moves along the row of fasteners forming the head as its goes.

The invention will now be described in greater and more specific detail, the applicator tool includes a clamping bar 36 (see FIG. 5) which is pressed against the bottom plate 24 to clamp the belt 20 between the bottom plate 24 and top plate 14. The belt end and belt fasteners are tightly clamped in position before the rivet ends 38 are deformed or flared out, preferably by a spinning forming head 40 as shown in FIGS. 6 and 7, to form the rounded rivet head 42 which maintains the clamping force of the top plate 14 and bottom plate 24 upon the belt 20 to secure the belt therebetween.

A plurality of fasteners 10 are secured at the belt ends 18 of opposing belt sections 20, preferably traversing the entire width of the belts 20 as illustrated in FIG. 11. The hinge loops 26 of opposing belt fasteners 10 overlap when brought together, whereby a hinge pin 44 passed through the plurality of overlapping hinge loops 26 pivotally connects the belt ends 18 together.

In operation, the fasteners 10 are placed on the belt ends 18 manually, with clamping of the fasteners and forming of the rivet heads 42 performed mechanically on the applicator tool which includes the forming press 50. The forming press 50 is desirable in order to attain higher pressures than those reasonably attainable with a hand held drill, which higher pressures are desired in the forming of rivet heads 42. A plurality of generally uniformly spaced belt apertures 16 are first formed across the width of a belt 20 to be fastened, near the belt end 18 thereof. The belt apertures 16 are spaced from the belt end 18 an amount sufficient to provide the requisite material strength between the belt apertures 16 and the belt end 18, since this section of the belt 20 bears the greatest stresses during belt operation. However, the belt apertures 16 must be made sufficiently close the belt end 18 to assure that, when the rivet 12 is inserted in the belt aperture 16, the belt end 18 does not extend into the recess at the hinge loop 26. This is to assure unimpeded passage of a hinge pin 44 through the overlapping hinge loops 26 of fasteners 10 secured along the width of opposing belt ends 18 (see FIG. 9).

A metal belt template has been found useful in providing for uniform spacing of the belt apertures 16 across the width of a belt. The template is placed on a belt section near its end and includes uniformly spaced holes through which punches or drill bits are received into puncture the belt, thereby providing accurate location of the holes along the belt end.

A plurality of fasteners 10 are first manually placed across the width of a belt end 18 by separating the top plate 14 and bottom plate 24 of the fasteners 10 (see FIG. 3) and inserting the rivets 12 of the fasteners through the apertures 16 (see FIG. 4). The belt end 18 with the fasteners 10 thereon is then placed onto a forming press in which the fasteners 10 are clamped in a closed position in tight engagement with the belt, and the rivet ends 38 thereafter formed into rivet heads 42 to maintain the tight clamping of the fasteners 10 to the belt 20.

Clamping of the fasteners 10 to their closed position prior to forming the rivet ends 38 into rivet heads 42 is desirable in that is provides for tighter clamping of the top plates 14 and bottom plates 24 about the belt 20 than fasteners secured without clamping. The clamping is done with a high pressure which forces the top plate 14 and bottom plate 24 tightly into compression with the opposing upper side 32 and lower side 34 of the belt 20. The top and bottom plates have tapered ends 33 to minimize the potential for hangup of the fasteners 10 with conveyed items or driving machinery.

Tight clamping prior to forming of the rivet head 42 also provides for exposure of a greater portion of the rivets 12 extending through the rivet receiving apertures 22, allowing for the forming of a larger rivet head 42 than nonclamped fasteners. Larger rivet heads 42 are desirable in that the increased rivet head area in contact with the bottom plate provides for a wider distribution of the forces required to be taken up by the rivet head 42.

The forming press 50 includes a clamp unit, referred to generally at 52, which maintains the aforementioned clamping force on the fasteners 10 during forming of the rivet heads 42. With reference to FIGS. 10 and 11, the clamping unit 52 includes a clamping bar 36 which exerts a downward force upon the bottom plate 24 (see FIG. 5) of the fasteners 10 to tightly clamp the belt 20 between the bottom plate 24 and the top plate 14 of the fasteners 10. The clamping bar 36 comprises an upper horizontal leg 54 and a vertical leg 56, which may be formed integrally or otherwise fastened together perpendicularly with respect to one another as seen in FIGS. 1, 2, 10 and 11, so that the horizontal leg 54 and vertical leg 56 move together as a single clamping bar 36. With reference to FIGS. 10 and 11, three guide shafts 58 extend vertically upward from a base 60 and are received in clamping bar apertures 62 to define a path of accurate vertical translation of the clamping bar 36. The base 60 includes a series of aligned recesses or pockets along its forward edge to receive each loop 26 of the series of belt fasteners to hold the loops against turning or rotating and to assist in locating rivets under the forming tool 40 to achieve a uniform reach back distance for each belt fastener. The clamp unit 52 may also include a stepping block to serve as a guide for defining the extent of downward movement of the clamping bar 36 to provide accurate clamping force to the fasteners 10.

In order to exert and maintain a downward force on the clamping bar 36 in the direction of the base 60, and thus maintain clamping together of the top plate 14 and bottom plate 24, the central guide shaft 58 includes a camming ring 64 at the end thereof, to which camming head 66 is pivotally connected (see FIGS. 1 and 2). The camming head 66 includes a handle 68 by which an operator can rotate the camming head 66 to effect camming action of the camming head against the horizontal leg 54 of the clamping bar 36. Thus, the vertical leg 56 of the clamping bar 36 exerts a downward force on the bottom plate 24 of one or more fasteners 10 generally simultaneously to tightly clamp the belt portion 20 situated between the top plates 14 and the bottom plates 24 of the fasteners. This is illustrated by comparing FIG. 1 with FIG. 2 in which the fastener 10 of FIG. 1 is unclamped, with the clamping bar 36 resting freely upon the fastener 10; whereas, the fastener of FIG. 2 is clamped to the belt 20 by downward movement of handle 68 whereby the vertical leg 56 of the clamping bar 36 exerts a downward force upon the bottom plate 24. It is readily appreciated that other clamping means, such as a screw clamp or the like, are suitable for carrying out the present invention.

The downward force of the clamping bar 36 on the bottom plate 24 exposes the free ends 38 of the rivets 12 through rivet receiving apertures 22 (see FIG. 5). As discussed above, tight clamping down on the bottom plates 24 is desired in that it exposes a larger portion of the free ends 38 of the rivets 12 allowing for the forming a larger rivet head 42 than otherwise attainable. Of course, tight clamping during the formation of the rivet heads 42 is also desirable so that the fasteners 10 will maintain tight clamping on the belt 20 after formation of the rivet head 42 and removal of the clamping bar 36.

The forming press 50 further includes a spinning forming tool 40 which is sequentially brought into contact with each of the rivet free ends 38 to deform the rivet ends 38 into rivet heads 42 (see FIG. 6). The clamping force of the clamping unit 52 is maintained on the fasteners 10 during usage of the forming tool 40 to provide exposure of a large portion of the rivet free end 38 for reasons discussed above. Enlargement of the rivet ends 38 into rivet heads 42 provides a force bearing surface to prevent significant separation of the bottom plate 24 with respect to the top plate 14, thereby maintaining clamping of the top plate 14 and bottom plate 24 on the belt 10.

The forming tool 40 is preferably cylindrical and mounted in a depending vertical position from a chuck 72 mounted on the lower end of vertically oriented shaft 73 of an AC drive motor 71 as shown in FIGS. 1 and 2 to rotate therewith. Other drive means, such as a DC motor or air motor, may be employed as well. The forming tool 40 includes a forming surface 70 at the free end thereof which frictionally engages with the rivet ends 38 to effect their deformation. As best seen in FIG. 7, the forming surface 70 is generally curved inward from its circumference to provide a recess therein which defines the shape of the formed rivet head 42. The forming surface 70 includes an alignment point 72 which extends from the center of the forming surface 70. The alignment point 72 is received in the hollow portion 74 of the rivet ends 38 to provide for accurate centering of the forming tool 40 on the axis of the bore in the rivet end 38. Centering of the forming surface 70 provides uniform deformation of the rivet ends 38 upon their deformation into rivet heads 42. Thus, when a spinning forward tool 40 is lowered and brought into frictional engagement with a rivet end 38, the rivet end 38 is flared outward and formed into the shape defined by the forming surface 70.

The rivet ends 38 are hollow to allow for easier radially outward deflection, or flaring out, of the rivet ends 38. The depth of the hollow portion 74 of the rivet ends 38 should be sufficient so that the entire portion of the rivet ends 38 extending through the rivet receiving apertures 22 is hollow. The preferred cross-sectional shape of the rivets 12 is shown in FIG. 8 in which it is seen that the rivets 12 have a D-shaped cross section and are provided with a hollow center 74. The non-circular shape of the rivets 12 includes a vertical preferred flat sidewall 94 on the rivets. The flat sidewall 94 faces inwardly toward the hinge loops. In molding, a slide in the mold is positioned to be removed transversely from between the upper and lower plates and between the hinge loops and the flat sidewalls 94 of the rivets. If the rivets were entirely circularly then the slide could not be slid outwardly as is done with the illustrated rivets. Manifestly, other cross-sectional rivet configurations may be used for carrying out the present invention should be molding techniques so allow.

Raising and lowering of the forming tool 40 into and out of engagement with the rivet ends 38 is accomplished by mounting the forming tool 40 and its drive motor 71 on a vertically translating carriage 76. The forming press 50, in its preferred embodiment, includes two vertical guide shafts 78 along which the carriage 76 translates vertically. A drive gear 80 is rotatably mounted to the guide shafts 78 on a horizontally extending drive shaft 82 for rotation with the drive shaft. That is, mounting blocks 84 are fixedly secured to the guide shafts 78, which mounting blocks receive a drive shaft 82 therein for rotation of the drive shaft 82, and hence the drive gear 80 mounted thereto, between the guide blocks 84 at a stationary height along the guide shafts 78. Accordingly, rotation of the drive gear 80 effects vertical translation of the carriage 76 and hence also the forming tool 40 in a manner discussed below.

The carriage 76 includes rack 86 which engages with the drive gear 80 to translate the carriage 76 vertically upon rotation of the drive gear 80. That is, the drive gear 80 remains at a fixed height along the guide shafts 78 as it rotates, with the rack 86 moving vertically upon rotation of the drive gear 80. Selective raising and lowering of the forming tool 40 is thus accomplished by rotation of the drive shaft 82, which is carried out through the pulling of a handle 88 connected to the drive shaft 82. As seen in contrasting FIGS. 1 and 2, pulling down on the handle 88 effects lowering of the carriage 76, and the forming tool 40 mounted thereon, between the raised position of FIG. 1 and the lowered position of FIG. 2. The carriage 76 is biased to its raised position by a spring 90 positioned between the guide shafts 78. Thus, after lowering the handle 88 to bring the forming tool 40 into frictional engagement with a rivet end 38 and deforming the rivet end 38 into a rivet head 42, the handle 88 is released to allow the automatic return of the carriage 76 and forming tool 40 to the raised position.

An adjustable stop 91, as shown in FIG. 2A, may be provided to limit the extent of downward travel of the carriage 76, thereby defining the maximum pressure of the forming tool 40 exerted upon the rivet ends 38. The stop 91 includes a height setting screw 93 which is adjustable to allow for variation of the downward limit of travel of the carriage 76 as desired, dependent upon the parameters of a particular run. That is, upon pulling down of handle 88 the carriage 76 is lowered until the stop pad 96 provided at the bottom of height setting screw 93 abuts the table 97 upon which the forming press 50 is mounted. By extending and retracting the screw 93, the maximum extent of downward travel of the carriage 76 can be varied.

More specifically, the threads of the height setting screw 93 engage with complementary interior threads provided in the base 95. Rotation of the height setting screw 93 in a first direction brings the screw 93 further into the base 95, thereby increasing the distance between the stop 95 and the table 97. Thus, screwing of the height adjusting screw 93 further into the base allows the carriage to travel further downward prior to abutment of the stop pad 96 against the table 97. Similarly, rotation of the screw 93 in the opposite direction brings the screw 93 further out of the base 95, thereby increasing the overall length of the adjustable stop 91 and causing abutment of the stop pad 96 against the table 97 to occur sooner in the path of downward travel of the carriage 97. Thus, the forming tool 40 which is mounted on the carriage 97 is stopped higher above the rivet ends 38 the greater the screw 93 is unscrewed outward from the base 95. Accordingly, less force is exerted upon the rivet ends 38 the further the height setting screw 93 is unscrewed from the base 95. A locking nut 98 is provided to secure the height setting screw 93 at a desired location.

In practice, an operator pulls on the handle 88 until the forming tool 40 deforms the rivet ends 38. The operator then adjusts the height setting screw 93, while maintaining the handle 88 in its lowered position, until the stop pad 96 contacts the table 97. This provides a rough estimate of the desired position of the height setting screw 93 for the particular fastener 10 being attached. Through a few trial runs, more precise positioning of the height setting screw 93 can be obtained to achieve optimal deformation of the rivet ends 38. The adjustable stop 91 thus reduces inconsistencies and inaccuracies in the depth of penetration of the forming tool into the hollow bore, and in the maximum forming pressure applied by the forming tool 40, to the rivet ends 38. Stop rings 92 as shown in FIGS. 1 and 2 may be provided on the guide shafts 78 as an alternative to the adjustable stop 91. Thus, with either embodiment, precise operator control of the force exerted on the handle 88 is not required to form substantially uniform rivet heads.

While deformation of the rivet ends 38 could be effected by application of heat thereto, such as with the use of a heating gun in conjunction with a forming tool, this is not preferred as the heat has been found to result in degradation of the plastic fastener material and cause sticking of the plastic fastener to the forming tool. Most of the belts are of a thermoplastic material and an inadvertent touching of the belt with the hot tool end could severely damage the belt. Also, deforming with heat requires finesse and skill, whereas deforming with a spinning forming tool 40 in accordance with the present invention does not require such skill. An operator merely aligns the forming tool 40 with the rivet end 38, pulls down on the handle 88 until it stops, and then releases the handle.

Lubricants applied to the rivet ends 38 have been found to assist in reducing material degradation and to improve uniformity in the deformation of the rivet ends 38. A preferred lubricant is a spray of non-stick food spray such as that sold under the tradename PAM, although other lubricants may be used between the spinning tool and the rivet end 38.

By way of example, a fastener 10 in accordance with the present invention was molded of Zytel 101 nylon material. Nylon has been found particularly well suited for carrying out the present invention due to its tensile strength, resilience and temperature range. Some nylons are for example a Du Pont Nylon 66 or a Zytel 101 nylon. It is brought that suitable polypropylene plastics or a blend of plastic materials could be used. A ⅛ hp AC motor with a rotational speed of between 1600 rpm and 2500 rpm was found to provide good results in deforming the rivet ends 38 into rivet heads 42. A heated tool such as soldering iron kind of tool could be used to melt and form the rivet ends 38 into rivet heads. The heat tends to deteriorate plastic as it is a higher temperature than the spinning induced temperatures which is just warm enough for the plastic to be deformed into the new shape under high pressure. For example a rotational speed of 3400 rpm was found to be too fast, resulting in the rivet ends 38 becoming too heated.

While the invention has been described with reference to a preferred embodiment, it will be understood to those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for attaching belt fasteners having integral plastic rivets each having a cylindrical end wall defining a hollow end for being flared outwardly into an enlarged rivet head to fasten the belt fasteners to belts, comprising:

a frame;

a spinning head on said frame to engage ends of the rivets and to deform these ends into enlarged rivet heads;

a rotatable forming tool on the spinning head having a central alignment point to be centered in the hollow end of a rivet, a curved wall on the forming tool extending radially outwardly from the central alignment point to engage the cylindrical end wall of the rivet end and to rotatably slide thereagainst to generate head by friction to soften the plastic end wall for flaring radially outwardly;

a belt clamp for clamping a belt with the belt fasteners thereon;

alignment means on said frame for aligning and supporting the respective belt fasteners with respect to the belt and to said spinning head;

actuator means for bringing said rotating spinning tool and its curved wall into contact with said fastener with sufficient force to generate heat and pressure to soften plastic end wall and to roll and flare it radially outwardly into the enlarged rivet head.

2. An apparatus in accordance with claim 1 wherein the rotational speed of the spinning head is in the range between 1600 rpm. to 2500 rpm.

3. An apparatus in accordance with claim 1 including stops to limit downward travel of the spinning head and thereby downward pressure of the spinning head on the rivet head.

4. An apparatus in accordance with claim 1 wherein a plurality of spinning heads are mounted on said frame with the actuator means bringing each of said spinning heads into contact with respective rivet heads.

5. An apparatus in accordance with claim 1 wherein the belt has lateral sides and said spinning head is mounted on the frame for sliding across the width of the belt from one lateral side thereof to the other.

6. An apparatus for attaching belt fasteners having integral plastic rivets each having a cylindrical end wall defining a hollow portion, the end wall being flared outwardly into enlarged rivet heads to fasten the belt fasteners to belts, comprising:

a frame;

a spinning head on said frame to engage ends of the rivets and to deform these ends into enlarged rivet heads;

a rotatable forming tool on the spinning head having a central alignment point to be centered in the hollow end of a rivet, curved walls on the forming tools extending radially outwardly from the central alignment point to engage the cylindrical end wall of the rivet end;

a belt clamp for clamping a belt with the belt fasteners thereon;

alignment means on said frame for aligning and supporting the respective belt fasteners with respect to the belt and to said spinning head;

actuator means for bringing said rotating spinning tool into contact with said fastener with sufficient force to generate heat and pressure to permanent roll and flare radially outwardly the plastic, cylindrical end wall into the enlarged rivet head; and stops to limit downward travel of the spinning head and thereby downward pressure of the spinning head on the rivet end.

7. An apparatus for attaching belt fasteners having integral plastic rivets each having a cylindrical end wall defining a hollow portion, the end wall being flared outwardly into enlarged rivet heads to fasten the belt fasteners to belts, comprising:

a frame;

a spinning head on said frame to engage ends of the rivets and to deform these ends into enlarged rivet heads;

a rotatable forming tool on the spinning head having a central alignment point to be centered in the hollow end of a rivet, curved walls on the forming tools extending radially outwardly from the central alignment point to engage the cylindrical end wall of the rivet end;

a belt clamp for clamping a belt with the belt fasteners thereon;

alignment means on said frame for aligning and supporting the respective belt fasteners with respect to the belt and to said spinning head;

actuator means for bringing said rotating spinning tool into contact with said fastener with sufficient force to generate heat and pressure to permanent roll and flare radially outwardly the plastic, cylindrical end wall into the enlarged rivet head; and a plurality of spinning heads being mounted on said frame with the actuator means bringing each of said spinning heads into contact with respective rivet heads.

8. An apparatus for attaching belt fasteners having integral plastic rivets each having a cylindrical end wall defining a hollow portion, the end wall being flared outwardly into enlarged rivet heads to fasten the belt fasteners to belts, comprising:

a frame;

a spinning head on said frame to engage ends of the rivets and to deform these ends into enlarged rivet heads;

a rotatable forming tool on the spinning head having a central alignment point to be centered in the hollow end of a rivet, curved walls on the forming tools extending radially outwardly from the central alignment point to engage the cylindrical end wall of the rivet end;

a belt clamp for clamping a belt with the belt fasteners thereon;

alignment means on said frame for aligning and supporting the respective belt fasteners with respect to the belt and to said spinning head; and actuator means for bringing said rotating spinning tool into contact with said fastener with sufficient force to generate heat and pressure to permanent roll and flare radially outwardly the plastic, cylindrical end wall into the enlarged rivet head; and the belt having lateral sides and said spinning head being mounted on the frame for sliding across the width of the belt from one lateral side thereof to the other.

* * * * *

UNITED STATES PATENT AND TRADEMARK OFFICE
CERTIFICATE OF CORRECTION

PATENT NO. : 5,291,644
DATED : March 8, 1994
INVENTOR(S) : Edward C. Musil

It is certified that error appears in the above-indentified patent and that said Letters Patent is hereby corrected as shown below:

In The Claims:

Column 10, Line 34, change "head" to --heat--.

Column 10, Line 54, change "head" to --end--.

Signed and Sealed this

Twenty-sixth Day of July, 1994

Attest:

BRUCE LEHMAN

*Attesting Officer*     *Commissioner of Patents and Trademarks*